United States Patent [19]

Eavenson et al.

[11] Patent Number: 5,013,992
[45] Date of Patent: May 7, 1991

[54] MICROPROCESSOR CONTROLLED BATTERY CHARGER

[75] Inventors: Jimmy N. Eavenson, Augusta; Donovan M. Pugh, Hephziba, both of Ga.

[73] Assignee: E-Z-Go Division of Textron Augusta, Ga.

[21] Appl. No.: 256,779

[22] Filed: Oct. 12, 1988

[51] Int. Cl.⁵ .............................................. H02J 7/04
[52] U.S. Cl. ........................................ 320/31; 320/37; 320/40
[58] Field of Search ....................... 320/20, 21, 32, 37, 320/38, 39, 40, 31

[56] References Cited

U.S. PATENT DOCUMENTS

| | | | |
|---|---|---|---|
| 4,583,035 | 4/1986 | Sloan | 320/31 X |
| 4,639,655 | 1/1987 | Westhaver et al. | 320/20 X |
| 4,710,694 | 12/1987 | Sutphin et al. | 320/39 X |

Primary Examiner—R. J. Hickey
Attorney, Agent, or Firm—Perman & Green

[57] ABSTRACT

A battery charger 10 includes a microprocessor device 12 coupled to a voltage to frequency converter 18 for determining a magnitude of a voltage potential appearing across a battery under charge. The microprocessor has an output for activating a source of battery charging power when the determined magnitude of the voltage is within a predetermined range of voltages. During a charge cycle the microprocessor maintains an elapsed time counter and determines if a battery reaches full charge within 30 minutes or does not reach a full charge after 16 hours. In either case the source is deactivated. The microprocessor also determines when a battery reaches a threshold voltage after which the rate of rise of the battery voltage is compared to a predetermined rate of rise. When the measured rate of rise is less than the predetermined rate of rise the microprocessor initiates a final charge cycle wherein the battery is charged for one additional hour. The battery charger includes a display 20 wherein the microprocessor displays the elapsed charge time or the measured battery voltage or a number of codes such as error codes. The battery charger further includes a backup timer 30 which deactivates the source of battery charging power after 16 hours.

4 Claims, 2 Drawing Sheets

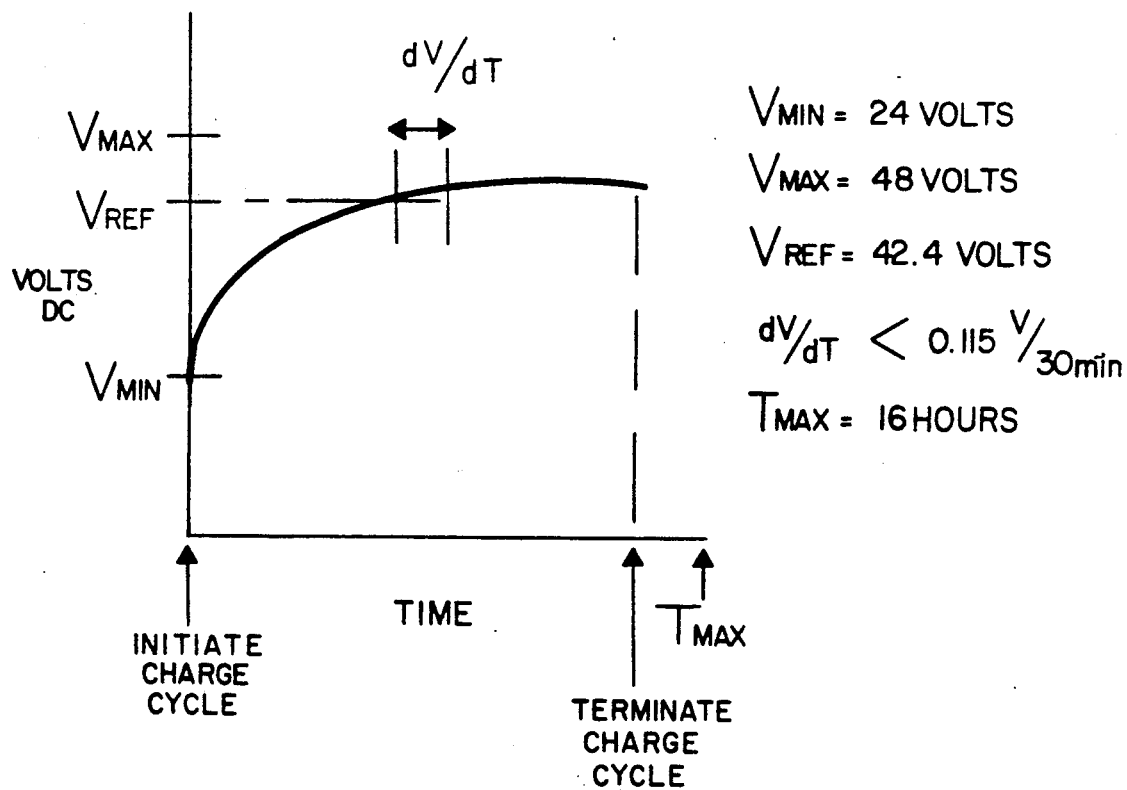

MICROPROCESSOR CONTROLLED BATTERY CHARGER

FIELD OF THE INVENTION

This invention relates generally to battery chargers and, in particular, to a microprocessor controlled battery charger having a controlled final charge cycle.

BACKGROUND OF THE INVENTION

Battery chargers are widely used in industrial and commercial applications to provide for the continued use of battery powered apparatus. For example, battery powered vehicles, such as golf carts, must be periodically recharged. As can be appreciated, some users of golf carts may maintain a fleet of dozens of such vehicles. As such, the costs associated with recharging of these batteries, such as 36 volt lead-acid batteries, is substantial. Furthermore, due to the cost of such large batteries, an important consideration is that the charging operation does not damage the battery, as may occur when the battery is overcharged. Another consideration is that weak or defective batteries should be readily identified before the costs associated with an attempted recharge are incurred. Still another consideration is that a fully charged or nearly fully charged battery be identified early in the charging cycle so that the cost of an entire charging cycle be avoided. Conditions arising from the inadvertent disconnection of a battery during the charging cycle should also be readily identified.

Inasmuch as conventional battery chargers typically operate on a fixed charge time basis, such as by a timer or a manual control of the battery charger, such desirable features are not achieved. That is, a battery that is fully charged early in the charging cycle will continue to be charged, resulting in a waste of electrical energy. Weak or defective batteries are not readily identified nor are conditions which prevent a full charge from occurring, such as an inadvertent disconnection of the battery charger. Conventional chargers may also overcharge and damage a battery.

SUMMARY OF THE INVENTION

The foregoing problems are overcome and other advantages are realized by a battery charger constructed and operated in accordance with the invention. The battery charger comprises a battery charge control means such as a microprocessor device coupled to a voltage measuring device for determining a magnitude of a voltage potential appearing across a battery under charge. The microprocessor has an output for activating a source of battery charging power when the determined magnitude of the voltage is within a predetermined range of voltages. During a charge cycle the microprocessor maintains an elapsed time counter and determines if a battery reaches full charge within 30 minutes or does not reach a full charge after 16 hours. In either case the source is deactivated. The microprocessor also determines when a battery reaches a threshold voltage after which the rate of rise of the battery voltage is compared to a predetermined rate of rise. When the measured rate of rise is less than the predetermined rate of rise the microprocessor initiates a final charge cycle wherein the battery is charged for one additional hour. The battery charger includes a display wherein the microprocessor displays the elapsed charge time or the measured battery voltage or a number of codes such as error codes. The battery charger further includes a backup timer which deactivates the source of battery charging power after 16 hours.

BRIEF DESCRIPTION OF THE DRAWING

These and other aspects of the invention will be made more apparent in the ensuing Detailed Description of the Invention when read in conjunction with the attached Drawing wherein:

FIG. 2 is a graph which illustrates the charging characteristic of the battery charger of FIG. 1.

DETAILED DESCRIPTION OF THE INVENTION

Figure 1:
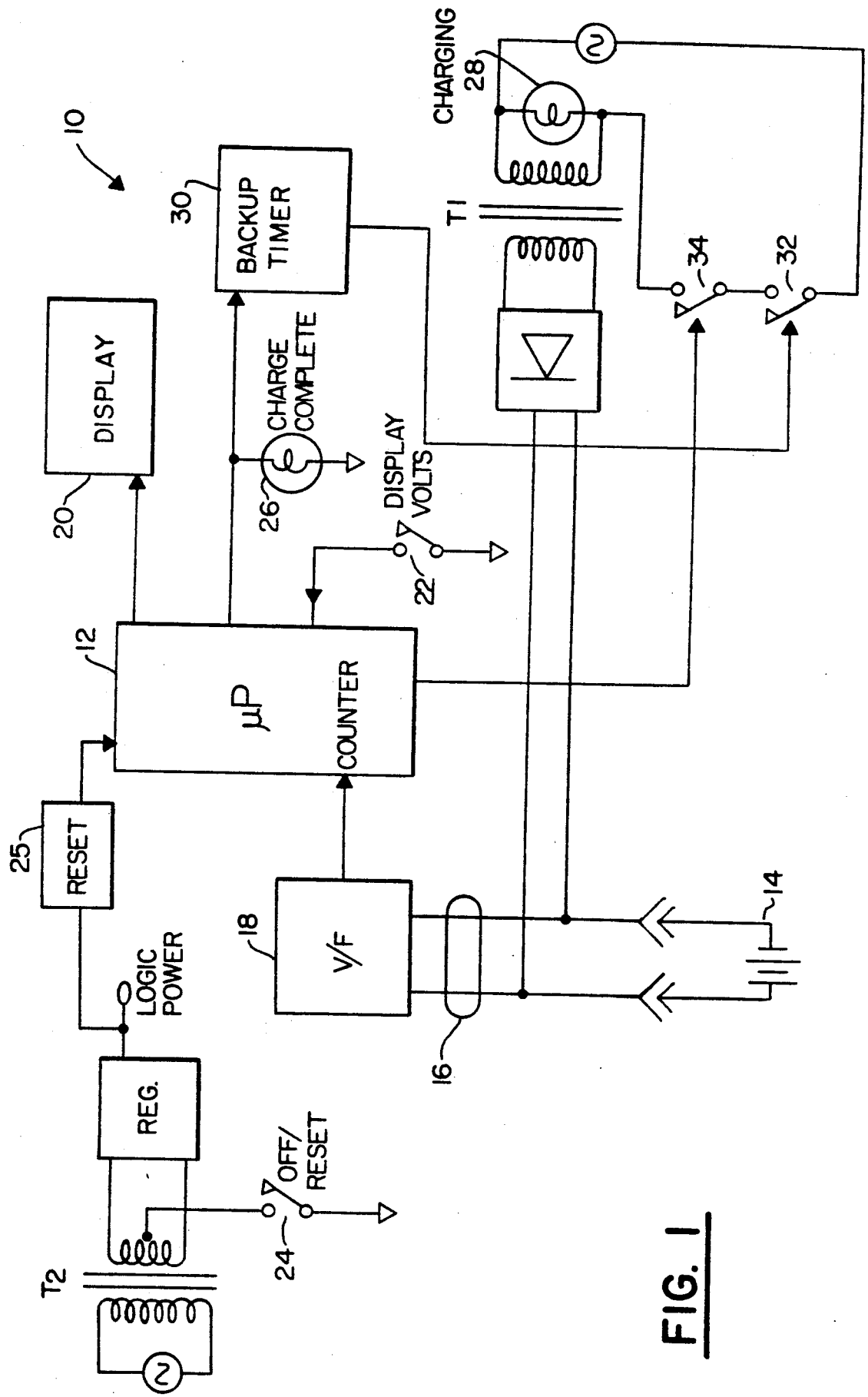
FIG. 1 is a block diagram of a battery charger constructed in accordance with the invention.

Referring now to FIG. 1 there is shown in block diagram form a battery charger 10 which is constructed in accordance with the invention. Charger 10 comprises a battery charge control means such as a microprocessor 12. In a preferred embodiment of the invention microprocessor 12 is a "single chip" type of microprocessor having internal ROM for program storage and also internal RAM for internal read/write storage. Microprocessor 12 also has a plurality of input/output (I/O) signal lines for connecting to other devices within the charger 10. One suitable type of microprocessor 12 is known as a MC68(7)04P2 and is manufactured by Motorola, Inc. Of course, a large number of suitable types of microprocessor devices may be employed to control the battery charge cycle. Thus, the invention should not be construed to be limited to only this presently preferred embodiment of a battery charge control means.

Charger 10 is coupled to a battery 14 via a cable 16. Cable 16 couples the battery 14 to a voltage determining device whereby the battery voltage is determined by the microprocessor 12. Cable 16 also couples the battery 14 to a source of charging power. The voltage determining device is, in a preferred embodiment of the invention, a voltage to frequency (V/F) convertor 18 which is operable for converting a voltage potential appearing across the battery terminals to a frequency pulse train which is input to a timer/counter input of microprocessor 12. Microprocessor 12 is programmed to count the frequency of the input pulse train, the frequency being a function of the battery voltage. V/F convertor 18 may be a type known as an AD654 device which is manufactured by Analog Devices, Inc. A suitable transfer function for V/F 18 is 100 HZ/volt. It should be realized that any suitable voltage determining means may be employed such as an analog to digital (A/D) convertor. However, typical A/D convertors require a plurality of digital output signal lines to be coupled to the microprocessor 12 whereas the V/F 18 requires but one I/O signal line.

The source which provides charging power comprises a transformer T1 and a rectifier for deriving a DC voltage for charging the battery 14. In a preferred embodiment of the invention T1 is a ferro-resonant type of transformer. Such transformers are inherently self-regulating and are also typically more energy efficient that conventional transformers.

Microprocessor 12 is also coupled to a display device such as a four digit LED display 20 whereby the microprocessor 12 may display elapsed charge time. Display 20 may also be employed to display various codes to an operator, the codes referring to error conditions or a condition wherein a battery reaches full charge within an initial predetermined amount of time. These aspects of the invention will be described in further detail below.

Charger 10 includes a Display Volts switch 22 whereby an operator may indicate whether the display 20 is to display elapsed charge time or battery voltage. Charger 10 also includes a plurality of indicator lights whereby the status of the charging operation is displayed to an operator.

The Display Volts switch 22, when closed by the operator, indicates to microprocessor 12 that the battery voltage is to be displayed in display 20. A Charge Complete lamp 26 is illuminated by the microprocessor 12 to indicate that a charging cycle has been completed. An I/O signal line which controls the operation of the Charge Complete lamp 26 also is coupled to a Backup Timer device 30. Microprocessor 12 drives the I/O signal line at the beginning of a charge cycle to extinguish the Charge Complete lamp 26. This simultaneously initiates a counting sequence in the Backup Timer 30, the Timer 30 being configured as a 16 hour timer. An output of Timer 30 is coupled to a switching device 32 such that at the end of the 16 hour count charging power is removed from the battery under charge regardless of the operation of microprocessor 12. This feature of the invention ensures that a battery will not be overcharged. Microprocessor 12 has another I/O signal line coupled to a switching device 34 for applying charging power to the battery under charge. The switching devices 32 and 34 may each be transistors which are coupled together and which, when both are on, permit current flow through a relay winding. The relay being energized pulls in a pair of contacts which close the primary circuit of T1. A Charging lamp 28 in parallel with the primary winding circuit of T1 is illuminated during a charging operation to indicate that a battery is being charged.

Charger 10 also includes a logic power transformer T2 which provides regulated DC power to microprocessor 12 and the other logic devices. An Off/Reset switch 24 is closed by the operator to initiate a charging operation. A reset device 25, such as a resistor and capacitor network, applies a reset pulse to microprocessor 12 to initiate processing thereon.

There will now be described the operation of the charger 10 during the charging of a battery. This description of the operation will be made in the context of a 36 volt lead-acid battery although it should be realized that the teaching of the invention applies to a variety of battery types, such as nickel-cadmium batteries and to batteries of differing voltage outputs. The graph of FIG. 2 illustrates the DC voltage potential across the battery terminals as a function of time.

An operator closing the Off/Reset switch 24 initiates the start of a charging sequence by applying DC power and the reset pulse to the microprocessor 12. After a software initialization sequence the microprocessor 12 determines from the V/F 18 counter input the voltage potential appearing across the battery under charge. If the voltage is determined to be either less than approximately 24 volts or greater than approximately 48 volts the microprocessor displays a fault indication on display 20 and terminates the battery charge cycle. A reading of less than 24 volts may indicate that the battery is defective or that the battery has fewer cells than a 36 volt battery. A voltage reading in excess of 48 volts may indicate that the battery has more cells than a 36 volt battery. A voltage reading in excess of 48 volts may also indicate that a battery has not been connected properly or that the battery has been disconnected. A voltage reading in excess of 48 volts, in this latter situation, results from an AC ripple component of the charging voltage increasing in amplitude due to the removal of the load represented by the battery.

If the battery under charge is determined to be a battery having a potential between 24 and 48 volts microprocessor 12 energizes switching device 34 to apply charging power to the battery. Microprocessor 12 simultaneously turns off the Charge Complete lamp 26, thereby activating the Backup Timer 30 to begin a 16 hour counting operation. Microprocessor 12 also initiates various internal timers wherein the elapsed time of the charging cycle is maintained.

Thereafter, microprocessor 12 repeatedly checks the internal timers to determine if the elapsed charged time is greater than 16 hours. Microprocessor 12 also determines if the voltage potential across the battery under charge is greater than a reference potential of, for example, approximately 42.4 volts. If the voltage is determined to be greater than 42.4 volts the microprocessor 12 initiates a final charge cycle as will be described below. If the elapsed time is found to exceed approximately 16 hours before the battery potential exceeds 42.4 volts the microprocessor 12 terminates the battery charge cycle and displays a code in display 20 which indicates that the battery could not be fully charged within a 16 hour period. This 16 hour period is considered to be a maximum amount of time ($T_{MAX}$) during which a battery should reach full charge.

If the elapsed time is determined to be less than 16 hours and the battery voltage is determined to be less than 42.4 volts the microprocessor 12 continuously loops through a sequence of battery voltage and elapsed time tests until either the elapsed time exceeds 16 hours or the battery voltage rises to 42.4 volts. During these tests if the battery voltage is determined to be in excess of 48 volts the microprocessor 12 displays a flashing elapsed time value in display 20. This indicates to an operator a time at which the battery was disconnected from the charger.

If the battery voltage is determined by the microprocessor 12 to be greater than 42.4 volts a further test is made to determine if the elapsed time is equal to or greater than approximately 30 minutes.

If the total elapsed battery charge time is determined to be less than 30 minutes an internal flag is set by the microprocessor 12, the charge cycle is terminated and a code is displayed to the operator which indicates that the battery reached full charge in less than 30 minutes. This condition generally indicates that the battery which was previously connected to the charger 10 was a fully charged or a nearly fully charged battery.

If the battery voltage reaches 42.4 volts after an elapsed charge time which is equal to or greater than 30 minutes a second flag is set by the microprocessor 12. This condition causes the microprocessor 12 to continue to charge the battery 14 for an additional 30 minutes before determining a rate of change of voltage across the battery. In accordance with one aspect of the invention the microprocessor 12 determines if the rate of change, or rise, of battery voltage over a predetermined interval of time (dV/dT) is equal to or less than a predetermined magnitude. If the rate of change of voltage is determined to be greater than this predetermined magnitude the charging cycle continues for at least another predetermined interval of time after which the rate of change of the voltage is once again determined. If instead the rate of change of voltage is determined to be equal to or less than the predetermined voltage the microprocessor 12 initiates a final charge cycle. The final charge cycle continues to charge the battery for one additional hour. At the end of this additional hour the charging power is removed from the battery by the microprocessor 12 opening the switching device 34. The microprocessor 12 also illuminates the Charge Complete lamp 26 to indicate to the operator that the charging cycle has terminated. Illuminating the Charge Complete lamp 26 also disarms the Backup Timer 30. The microprocessor 12 also displays in display 20 the total time that was required to charge the battery unless the Display Volts switch 22 was previously closed by the operator.

The predetermined rate of change of battery voltage over time has been determined to be approximately 0.115 volts per 30 minutes. That is, if the microprocessor 12 determines that the voltage potential across the battery under charge is increasing by an amount less than 0.115 volts in a 30 minute period the final charging cycle is initiated. This rate of voltage change has been determined to indicate that a 24 volt or 36 volt lead acid battery is nearing the end of a full charge cycle.

In accordance with another aspect of the invention, after removing the charging power from the battery the microprocessor 12 continues to monitor the voltage potential across the battery under charge. If the battery is not removed from the charger, such as during long term storage of the battery when it is desired to keep the battery in a fully charged condition, the microprocessor 12 continuously monitors the battery potential to determine if the potential decreases to a second reference potential of approximately 36.5 volts. If this condition is detected by the microprocessor 12 the microprocessor 12 automatically reinitiates a battery charge cycle, the cycle occurring as described above. It can be appreciated that this aspect of the invention permits for a battery to be stored during an extended interval of time and yet be retained in a fully charged state without operator intervention.

As was previously stated, the backup timer 30 ensures that the total amount of charge time will not exceed 16 hours. This prevents a battery from being overcharged and possibly damaged.

It can be appreciated that due to the operation of the charger 10 of the invention that only as much electrical power as is required to fully charge a battery is consumed during a charging cycle. That is, if a battery reaches full charge within less than 16 hours the charging cycle is terminated and the operator notified that the battery is fully charged. Thus, the disadvantages of conventional battery chargers which operate either manually or for a fixed charged time cycle are overcome. This results in an increase in battery life and a significant savings in electrical energy. Furthermore, the charger 10 identifies a defective battery before the charge cycle which results in a further savings in electrical energy. The microprocessor 12 is further capable of detecting and notifying an operator that a battery is not properly connected or has been disconnected.

As was previously stated what has been described is an illustrative embodiment of the invention and, as such, the invention should not be construed to be limited to only that disclosed above. In that those having skill in the art may derive modifications to the invention based on this disclosure it is intended that the invention be limited only as the invention is defined by the appended claims.

What is claimed is:

1. A battery charger comprising:

means for providing electrical power for charging a battery to a predetermined voltage potential;

means, coupled to the battery, for determining a magnitude of a voltage potential across the battery; and means, having a first input signal coupled to said determining means and a first output signal coupled to said power providing means, for controlling the operation of said power providing means for charging the battery, said controlling means being responsive to the determined magnitude of the voltage potential for activating said power providing means when the magnitude of the voltage potential is greater than a predetermined minimum voltage potential and less than a predetermined maximum voltage potential; wherein said controlling means is comprised of timer means for maintaining a time expressive of an interval of time that said power providing means is activated; wherein said controlling means is operable for deactivating said power providing means if the magnitude of the battery voltage potential exceeds a first reference voltage potential within a first predetermined interval of time; and wherein said first reference voltage potential is approximately 42.4 volts and wherein said first predetermined interval of time is approximately 30 minutes.

2. In a battery charger having at least two electrical terminals which are adapted for connection to a battery for coupling battery charging power to the battery, a method of charging a battery comprising the steps of:

measuring a voltage potential appearing across the two electrical terminals;

determining if the measured potential is within a range of acceptable voltage potentials;

if the potential is determined to be within the range of acceptable voltage potentials the method includes the steps of activating a source of battery charging power;

initiating a timer for recording a total amount of time that the source of battery charging power is activated; and in a repetitive manner determining if the voltage potential appearing across the two electrical terminals exceeds a first or exceeds a second predetermined voltage potential;

determining if the recorded time exceeds a predetermined maximum charge time; and if the determined voltage potential exceeds the second predetermined voltage potential the method includes the steps of:

determining if the recorded time is less than a predetermined minimum amount of time;

if the recorded time is determined to be less than the predetermined minimum amount of time the method includes the steps of deactivating the source of battery charging power; and displaying information to an operator;

if the recorded time is determined to be equal to or greater than the predetermined minimum amount of time the method includes a step of determining if a rate of change of the voltage potential is less than a predetermined rate of change;
if the rate of change is determined to be less than the predetermined rate of change the method includes the steps of
   initiating a final charge period wherein the source of battery charging power remains activated for a predetermined final period; and
   deactivating the source of battery charging power after the predetermined final period.

3. In a battery charger having at least two electrical terminals which are adapted for connection to a battery for coupling battery charging power to the battery, a method of charging a battery comprising the steps of:
   measuring a voltage potential appearing across the two electrical terminals;
   determining if the measured potential is within a range of acceptable voltage potentials;
if the potential is determined to be within the range of acceptable voltage potentials the method includes the steps of
   activating a source of battery charging power;
   initiating a timer for recording a total amount of time that the source of battery charging power is activated; and
in a repetitive manner
   determining if the voltage potential appearing across the two electrical terminals exceeds a first or exceeds a second predetermined voltage potential; and
   determining if the recorded time exceeds a predetermined maximum charge time; the method including a step of,
   deactivating the source of battery charging power if the magnitude of the battery voltage potential is determined to exceed the first reference voltage potential within a first predetermined interval of time, indicating that the battery was in a fully charged or a substantially fully charged condition when a charging cycle was initiated, and
   wherein said first reference voltage potential is approximately 42.4 volts and wherein said first predetermined interval of time is approximately 30 minutes.

4. A battery charger for charging a lead-acid battery, comprising:
   means for electrically coupling terminals of a lead-acid battery to a source of battery charging power;
   voltage measuring means having an input coupled to said electrical coupling means for measuring a voltage potential between the terminals of the battery; and
   microprocessor means having a first input coupled to an output of said voltage measuring means for receiving the measured voltage potential therefrom, said microprocessor means further having a first output signal coupled to said source of battery charging power for controlling the activating and deactivating of said source;
   said battery charger further comprising timer means having an input coupled to a second output signal of said microprocessor means, said timer means being activated by said microprocessor means for generating an output signal after a predetermined interval of time, said timer means output signal being coupled to said source of battery charging power for deactivating said source after the predetermined interval of time, said timer means further maintaining a time expressive of an interval of time that said source of battery charging power is activated; and wherein
   said battery charger further comprises means coupled to said microprocessor means and responsive thereto for deactivating said source of battery charging power if the magnitude of the voltage potential exceeds a reference voltage potential within a predetermined initial interval of time, indicating that the battery was in a fully charged or a substantially fully charged condition when a charging cycle was initiated, and
   wherein said reference voltage potential is approximately 42.4 volts and wherein the predetermined initial interval of time is approximately 30 minutes.

* * * * *